Figure 1:
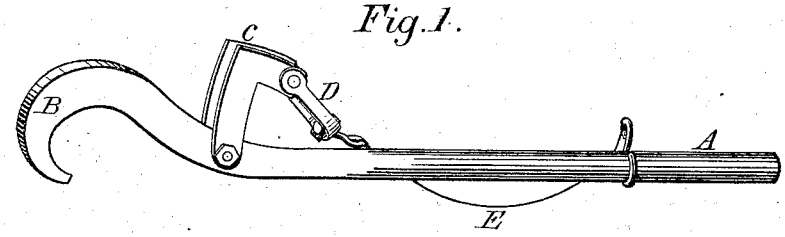

D. D. HARDY.
Car-Starter.

No. 160,769. Patented March 16, 1875.

Attest:
J. B. Lipscomb
J. O. Holderby

Inventor:
Dexter D. Hardy
per R. S. & A. P. Lacey

UNITED STATES PATENT OFFICE.

DEXTER D. HARDY, OF DELAVAN, ILLINOIS, ASSIGNOR OF TWO-THIRDS HIS RIGHT TO CHARLES L. BOOTH AND JOHN R. STONE, OF SAME PLACE.

IMPROVEMENT IN CAR-STARTERS.

Specification forming part of Letters Patent No. 160,769, dated March 16, 1875; application filed January 4, 1875.

*To all whom it may concern:*

Be it known that I, DEXTER D. HARDY, of Delavan, in the county of Tazewell and State of Illinois, have invented certain new and useful Improvements in Car-Starters; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to that class of car-starters consisting of a single lever provided with a hook for catching over the axle, and operated from the rear of the car. It consists in two cams hinged to the sides, and so as to embrace and turn above the lever, and held or bound together by a yoke or clevis, all so arranged as to gripe the axle, and so as to enable the operator to stand in rear of the car and reach the axle and operate the device without putting his hands to the cams to adjust the latter to or remove them from the axle.

Referring to the drawings, A is the lever; B, the hook on the end of the lever, so constructed as to fit neatly over the axle of the car-wheels. C are two cams, having the arms $a$ and $b$. The ends of the arms $b$ are pivoted to the lever and have a free vertical action. They are secured one on either side of the lever, so as to prevent twisting or lateral turning of the device when in use. The edges of the arms $a$ next the hook B are made slightly convex. They are so placed on the lever A that when in use the axle of the car-wheels will be griped or wedged in between them and the hook B. They are hinged so as to turn above the lever, which arrangement places them under the control of the operator, who can adjust them to or remove them from the axle without getting under the car for either purpose. D is a clevis or connecting-link pivoted to the tops of the arms $a$. It holds together and secures a vertical and uniform action in, and prevents the twisting or breaking of, the arms $b$. E is a cord attached to the clevis D. It extends back along the lever, and is secured at a convenient place to be readily caught by the operator when desirable.

Figure 2:
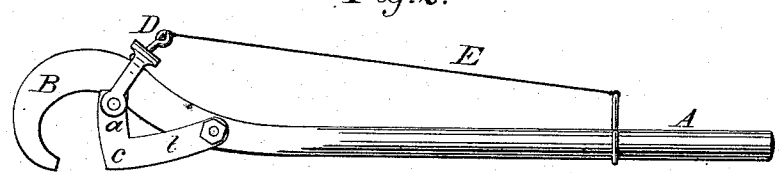
Figure 3:
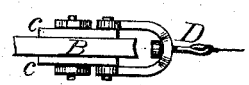

To use the invention the several parts are placed in the position shown in Figure 2. The hook is placed over the axle of the car-wheel, the cam turning upward sufficient to permit. By drawing the lever upward the convex edges of the arms $a$ are drawn down and tightened against the axle, so that the latter is held by the device with sufficient firmness to enable the operator to turn the wheels of the car. The depression of the lever pushes the cams upward and instantly releases the hold of the device on the axle.

It will be seen that the device can be used with ease, and as the car commences to move can be adjusted instantly, so as to enable the operator to keep an almost constant power exerted on the axle to propel the car until the latter has reached the speed desired.

When it is desired to remove the device from the axle, the cord E is drawn by the hand and the cams pulled into the position shown in Fig. 1, after which the hook B can be readily taken off said axle.

Having described my invention, what I claim, and desire to secure by Letters Patent, is—

In a car-starting device the two cams C hinged to the outer sides of and so as to turn above the lever A, and secured together by the yoke or clevis D, substantially as and for the purpose specified.

In testimony that I claim the foregoing as my own I hereto affix my signature in presence of two witnesses.

DEXTER D. HARDY.

Witnesses:
   MINER D. BEECHER,
   STEPHEN K. HATFIELD.